(12) United States Patent
Lang et al.

(10) Patent No.: US 6,416,191 B1
(45) Date of Patent: *Jul. 9, 2002

(54) DOUBLE WALLED CARRIER PLATE AND RELATED MIRROR ASSEMBLY

(75) Inventors: Heinrich Lang, Ergersheim; Wolfgang Seiboth, Bad Windsheim, both of (DE)

(73) Assignee: Lang-Mekra North America, LLC, Ridgeway, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/505,247

(22) Filed: Feb. 15, 2000

(30) Foreign Application Priority Data

Mar. 23, 1999 (DE) .......................................... 199 13 072

(51) Int. Cl.[7] .............................. G02B 5/08; G02B 7/18
(52) U.S. Cl. ..................... 359/841; 359/872; 248/475.1
(58) Field of Search ................................ 359/841, 871, 359/872, 873, 874, 876; 248/475.1, 479

(56) References Cited

U.S. PATENT DOCUMENTS

| 3,346,229 A | 10/1967 | Carson, Jr. |
| 3,637,186 A | 1/1972 | Greenfield |
| 4,125,244 A | 11/1978 | Lukey |
| 4,186,905 A | 2/1980 | Brudy |
| 4,197,762 A | 4/1980 | Yamana |
| 4,555,166 A | 11/1985 | Enomoto |
| 4,623,115 A | 11/1986 | Brester |
| 4,681,409 A | 7/1987 | Enomoto |
| 4,692,000 A | 9/1987 | Wada et al. |
| 4,786,156 A | 11/1988 | Kotani et al. |
| 4,789,232 A | 12/1988 | Urbanek |
| 4,809,561 A | 3/1989 | Tsuyama |
| 4,832,477 A | 5/1989 | Torii et al. |
| 4,988,178 A | 1/1991 | Eifert |
| 4,991,950 A | * 2/1991 | Lang et al. .................. 359/877 |
| 5,005,797 A | 4/1991 | Maekawa et al. |
| 5,081,546 A | 1/1992 | Bottrill |

(List continued on next page.)

FOREIGN PATENT DOCUMENTS

| DE | 2907433 C2 | 4/1981 |
| DE | 3731826 C2 | 6/1993 |
| DE | 4108882 C2 | 3/1994 |
| DE | 4339279 A1 | 5/1995 |
| DE | 4429604 A1 | 2/1996 |
| EP | 0609508 B1 | 8/1994 |
| GB | 1532065 | 11/1978 |
| GB | 2244965 A | 12/1991 |

OTHER PUBLICATIONS

U.S. Patent application No. 08/804,205, filed Feb. 21, 1997.
German Search Report, dated Feb. 4, 2002.
Translation of German Search report, dated Feb. 4, 2002.

*Primary Examiner*—Mark A. Robinson
(74) *Attorney, Agent, or Firm*—Dority & Manning, P.A.

(57) ABSTRACT

A double walled mirror carrier plate is disclosed for an external rearview mirror assembly for a vehicle, the assembly including a mirror holder for attachment to the vehicle, a housing pivotably secured to the mirror holder so as to pivot around a pivot axis, and a mirror pane disposed within the housing. One embodiment of the carrier plate includes a base plate defining a curved substantially U-shaped first end portion and a second end portion opposite the first end portion. The first end portion has a radius of curvature along the end portion extending in a plane substantially perpendicular to the pivot axis. The end portion curves substantially around the pivot axis, the mirror pane being securable to the base plate spaced from the first end portion. Other carrier plate designs and related mirror assemblies are also disclosed.

38 Claims, 5 Drawing Sheets

U.S. PATENT DOCUMENTS

| | | | |
|---|---|---|---|
| 5,110,196 A | 5/1992 | Lang et al. | |
| 5,120,015 A | 6/1992 | do Espirito Santo | |
| 5,137,247 A | 8/1992 | Lang et al. | |
| 5,212,467 A | 5/1993 | Park | |
| 5,227,924 A | 7/1993 | Kerper | |
| 5,268,795 A | 12/1993 | Usami | |
| 5,311,368 A | 5/1994 | Tsuyama | |
| 5,339,075 A | 8/1994 | Abst et al. | |
| 5,363,245 A | 11/1994 | Borello | |
| 5,432,640 A | 7/1995 | Gilbert et al. | |
| 5,483,385 A | 1/1996 | Boddy | |
| 5,497,275 A * | 3/1996 | Perry et al. | 359/873 |
| 5,497,305 A | 3/1996 | Pastrick et al. | |
| 5,583,495 A | 12/1996 | Ben Lulu | |
| 5,583,703 A | 12/1996 | Lang et al. | |
| 5,594,590 A | 1/1997 | Ishiyama | |
| 5,604,644 A | 2/1997 | Lang et al. | |
| 5,610,772 A | 3/1997 | Iizuka | |
| 5,615,054 A | 3/1997 | Lang et al. | |
| 5,621,577 A | 4/1997 | Lang et al. | |
| 5,625,502 A | 4/1997 | Hoogenboom et al. | |
| 5,684,646 A | 11/1997 | Boddy | |
| 5,687,035 A | 11/1997 | Lang | |
| 5,703,731 A | 12/1997 | Boddy et al. | |
| 5,703,732 A | 12/1997 | Boddy et al. | |
| 5,721,646 A * | 2/1998 | Catlin et al. | 359/865 |
| 5,781,354 A | 7/1998 | Sakata | |
| 5,786,772 A | 7/1998 | Schofield et al. | |
| 5,798,882 A | 8/1998 | Lang | |
| 5,844,733 A | 12/1998 | Ravanini | |
| 5,889,627 A | 3/1999 | Englander et al. | |
| 5,925,272 A | 7/1999 | Lang et al. | |
| 5,938,166 A | 8/1999 | Seichter et al. | |
| 5,963,127 A | 10/1999 | Lang et al. | |

* cited by examiner

DOUBLE WALLED CARRIER PLATE AND RELATED MIRROR ASSEMBLY

FIELD OF THE INVENTION

The invention is concerned with an outside mirror for motor vehicles in which a mirror is mounted on a carrier plate of a housing.

BACKGROUND OF THE INVENTION

As disclosed by DE 43 39 279, an outside mirror for motor vehicles is known in which in the housing of the mirror, a carrier plate is installed fastened to the side of the vehicle by means of a holder. On the carrier plate a mirror arrangement is placed, in some cases with an adjustment apparatus. A similar outside mirror is also disclosed in DE 44 29 604. So that the carrier plate can properly execute its carrying and holding function, at this stage of the technology, it must be comparatively high strength, since otherwise the connection to the holding means can be broken. This structural strength is achieved by corresponding massive construction, that is, by suitable high strength material. The massive nature substantially restricts the space available in the mirror housing for built-in devices, such as, electrical motor powered adjusting apparatuses, a Global Positioning System module, a display element, distance sensors, roadway marking recognition sensors, etc. The application of very high strength materials is not always possible due to cost factors.

SUMMARY AND OBJECTIVES OF THE INVENTION

Thus, it is an objective of the present invention to improve the outside mirror as described above in such a manner, that without diminishing the structural strength of the mirror, more installation space for built-in devices is made available within the mirror housing.

The achievement of the purpose is attained through the features of the present invention.

By means of a double walled carrier plate with a free space and reinforcing webs between the walls, a high degree of strength is achieved and the free space between the webs can be devoted to the insertion of built-in apparatuses of optional kinds.

Moreover, the fastening of the carrier plate on the holder is done by means of a coupling element, which is inserted into and affixed in the free space between the front and rear walls. By means of the double walled carrier plate with internal reinforcing webs, the front and rear walls along with the webs can be fabricated as relatively thin and still a high degree of strength is achieved. The double walled carrier plate can be comprised of metal, or, because of the strong structural formation, may also be made of plastic.

In accord with a preferred embodiment or the invention, the double walled carrier plate forms a loop on the end in proximity to the vehicle, in which a motor driven fold-up apparatus or a multi-toothed indexer can be installed. The loop enables a very good force-fit connection to be made between the holder and the carrier plate.

In accord with a further preferred embodiment of the invention, the front and rear walls converge in a direction toward the end remote from the vehicle. In this way, in a very simple manner, a greater installation space is available for the motorized fold-up apparatus on the vehicle proximal end, while, at the same time, an unnecessarily large volume is avoided at the end remote from the vehicle.

In accord with yet another preferred embodiment of the invention, the double walled carrier plate exhibits on both ends a smaller construction height than the dimension therebetween. In this manner, the carrier plate can be made to conform to the desired shape of the outside mirror. It should be noted, however, that the shape of the carrier plate, that is, the shape of the front and back walls is optional and especially the front and rear walls can exhibit a different surface shape.

In accord with another preferred embodiment of the invention, the mirror arrangement is connected with the carrier plate by means of a manual or electric motorized adjustment apparatus. The manual adjustment apparatus is joined to the carrier plate by a preloaded spring bayonet lock. This bayonet lock can be integrated into the double walled carrier plate in an advantageous manner.

In accord with yet another formulation of the invention, in the free space between the front wall and the back wall of the double walled carrier plate, various functional elements can be inserted. This especially includes a roadway marking sensor which is directed downward onto the road.

Further advantageous embodiments of the invention are also provided.

BRIEF DESCRIPTION OF THE DRAWINGS

Further details, features and advantages of the invention may be taken from the following description of a preferred embodiment of the invention with the aid of the drawing. There is shown in.

DETAILED DESCRIPTION OF THE PREFERRED EMBODIMENTS

Reference will now be made in detail to one or more preferred embodiments of the invention. This disclosure is provided by way of explanation of the invention and is not meant as a limitation of the invention. Thus, the present invention includes any modifications and variations of the following examples as come within the scope of the present claims and their equivalents.

Figure 1:
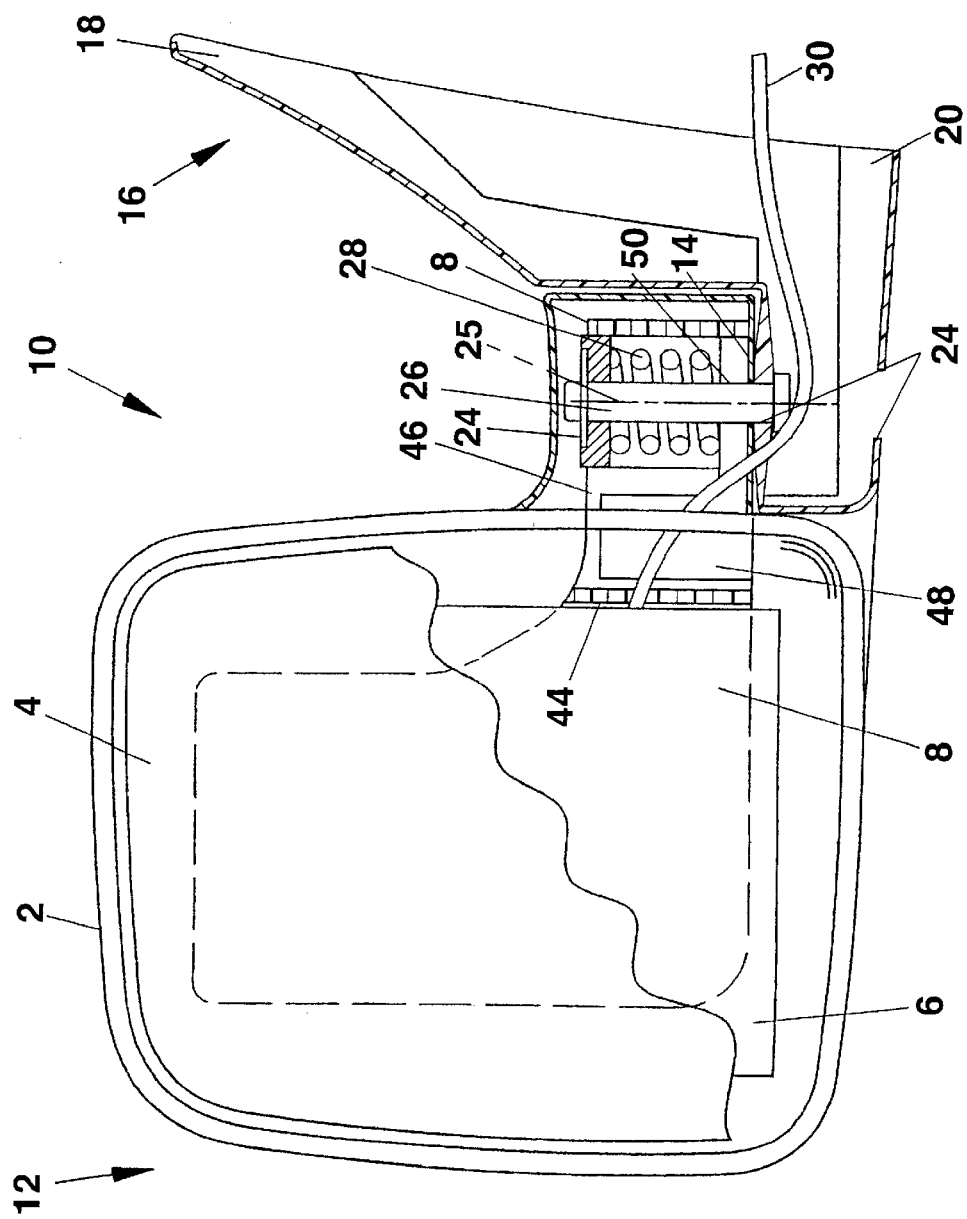
FIG. 1 a partial sectional, schematic view of one embodiment of an outside mirror assembly according to the invention, FIG. 2 a top perspective view of the outside mirror assembly of FIG. 1, without the holder, FIG. 3 a sectional view of the holder for the outside mirror assembly of FIG. 1, FIG. 4 a perspective view of a first and a second variant of a double walled carrier plate and a motorized fold-up device, for the outside mirror assembly of FIG. 1, FIG. 5 a horizontal sectional view of a slightly modified version of the double wall carrier plate of FIG. 4, FIG. 6 a sectional view of a manual adjustment apparatus for mirror placement suitable for use in the outside mirror assembly of FIG. 1, FIG. 7 a detailed view of the manual adjustment apparatus of FIG. 6, and FIG. 8 an electric motor powered adjustment apparatus suitable for use in the outside mirror assembly of FIG. 1.

FIG. 1 shows an embodiment of the outside mirror assembly, in accord with the invention, showing a mirror housing 2 and a mirror pane 4, the latter being mounted on a so-called raster plate 6. In regard to this described mirror assembly, which in the following will be designated as 7, refer to the published EP-A-0 609 508. Details of the assembly 7 are presented in FIG. 6 and will be further described in the following text.

In the mirror housing 2 is placed a double walled carrier plate 8. The outside mirror includes an end 10 proximal to the vehicle and an end 12 remote from the vehicle. On the end 10 proximal to the vehicle is provided an eye 14 for the hinge, by means of which the connection to a mirror holder 16 is made. The mirror holder 16 is essentially constructed in an "L" shape and possesses a long wing 18 and a short wing 20. The long wing 18 exhibits bolt holes 22, by means of which the holder 16 is screwed on to the vehicle. The short wing 16 extends away from the vehicle and possesses a boring 24 for the hinge defining a pivot axis 25. This hinge boring 24 of the short wing 16 and the hinge eye 14 are penetrated by a fastening bolt 26, which is tensioned by a spiral spring 28 and held in place by a washer assembly 29. The supply of current and signal technology is furnished by means of a cable 30.

Figure 2:
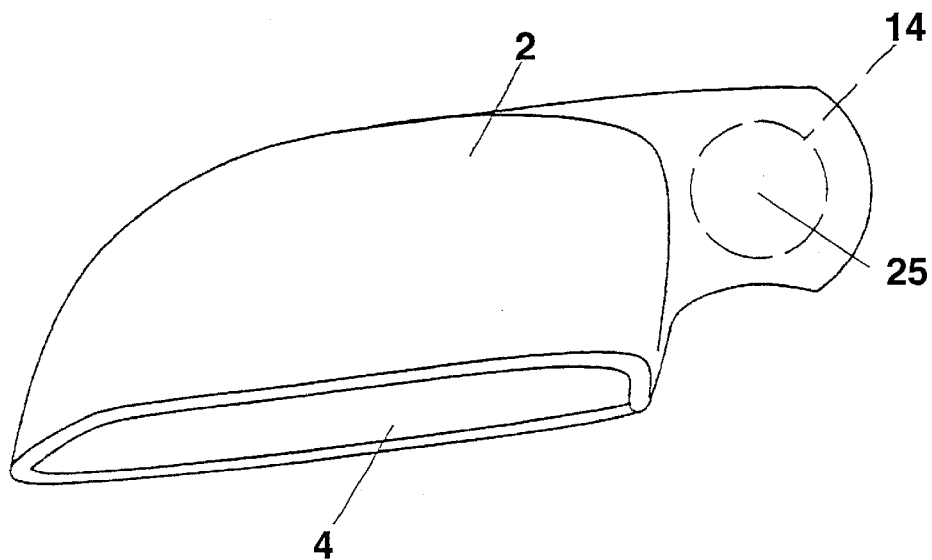
Figure 3:
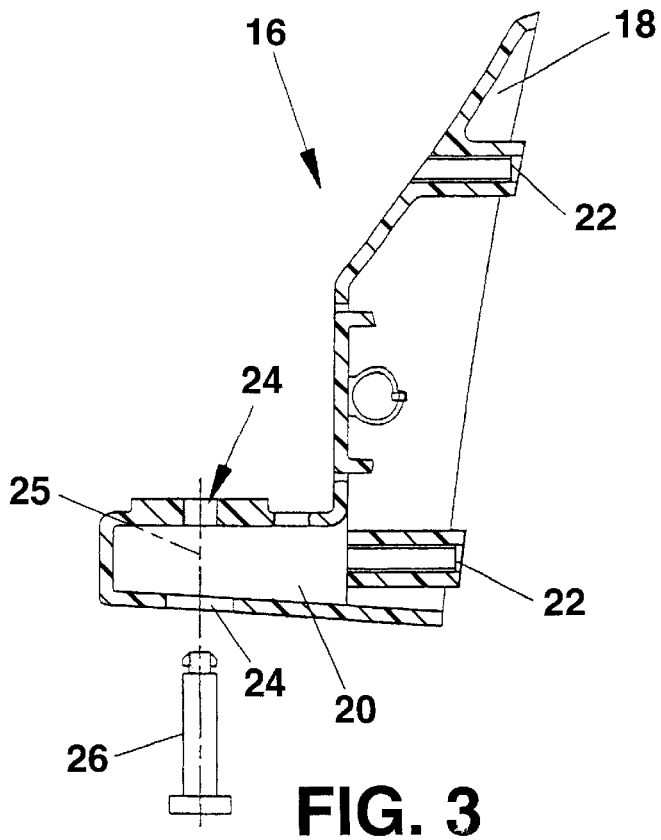

In FIG. 2, the outside mirror in accord with FIG. 1, is presented in perspective from above and is shown without the holder 16. The holder 16, without the remaining components of the outside mirror is shown in FIG. 3.

Figure 4:
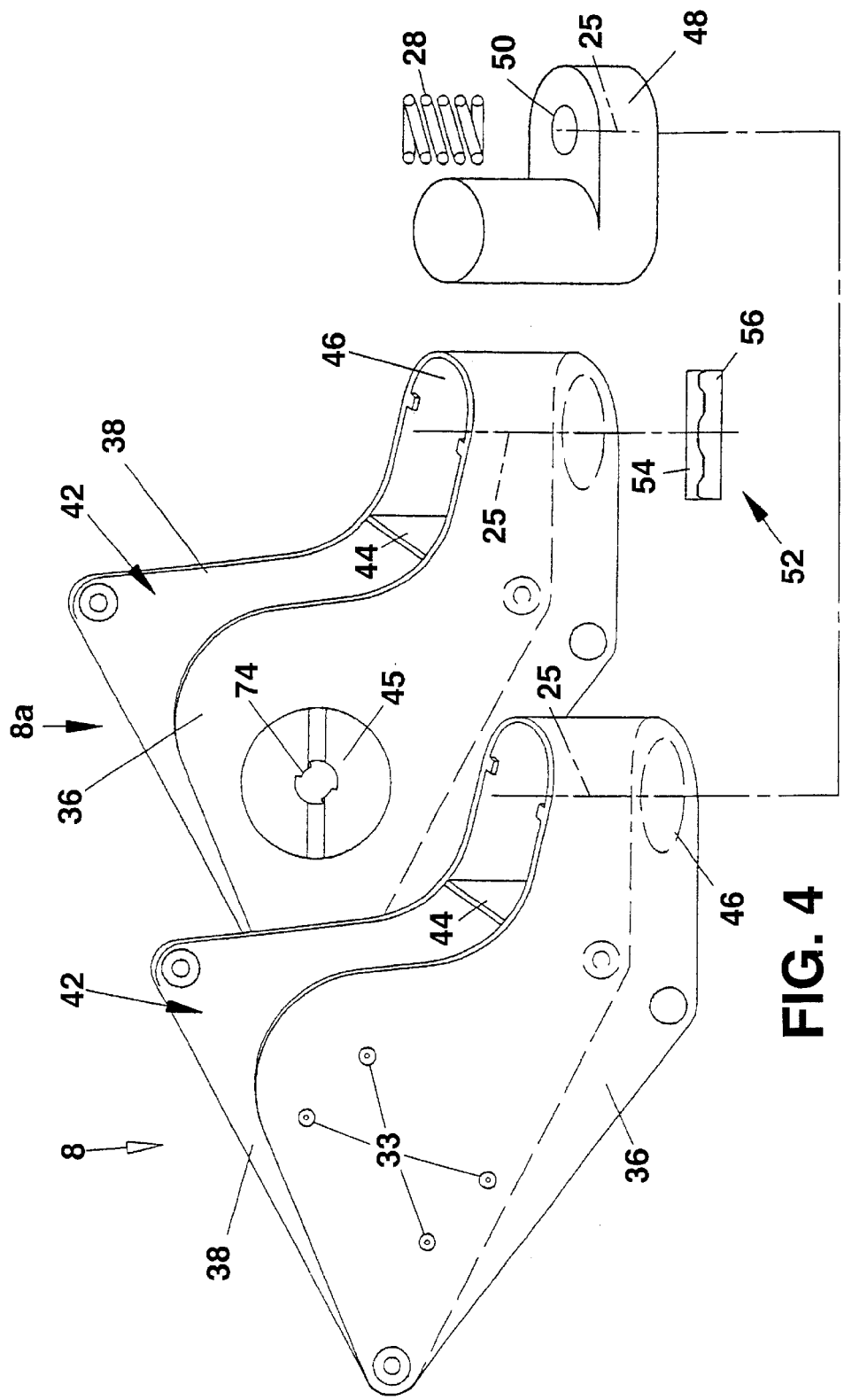
Figure 8:
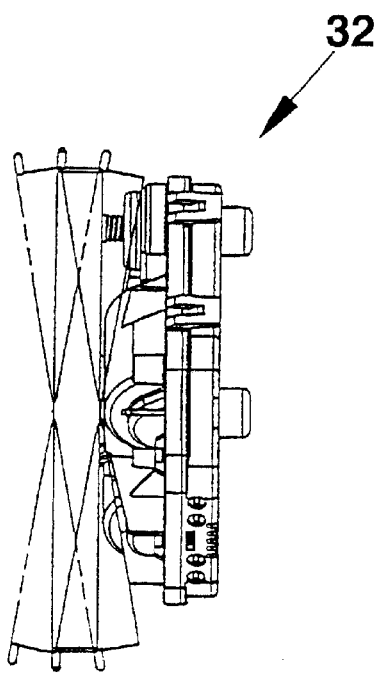

FIG. 4 depicts two variants of the double wall carrier plate 8 and 8a. The more forward carrier plate 8 is a variant arranged for in which the mirror assembly 7 is adjusted by an electric motor power device 32, as may be seen in FIG. 8, which is mounted on the carrier plate 8 via openings 33. The rearward carrier plate 8a in FIG. 4 is a variant, wherein the mirror assembly 7 is manually adjusted by a manual adjustment apparatus 34, and is similarly mounted on carrier plate 8.

Figure 5:
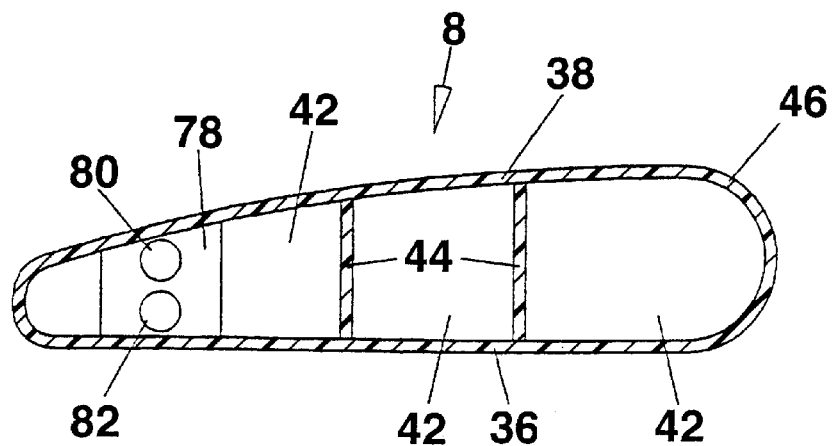

The double walled carrier plate 8 (or 8a) comprises, a front wall 36 and a rear wall 38, formed by the U-shaped bending of a base plate 40. Between the front wall and the rear wall 36, is a free space 42, in which reinforcing, cross-webs 44 are situated. By means of these cross-webs 44, the high strength of the double wall carrier plate 8 is achieved. The free ends of the U-shaped, bent base plate 40, that is, the end 12 of the front and rear walls 36, 38, are brought together in a wedge shaped fashion. FIG. 5 shows a variation of this arrangement in section, with end 12 joined in a curve, rather than a sharp point, as in FIG. 4. By means of the U-shaped bending of the base plate 40 on the end 10 proximal to the vehicle, a loop 46 is formed, in which, along-side the carrier plate 8, a motorized fold-up apparatus 48 is inserted as is shown in FIG. 4 and is affixed between the front and rear walls 38, 36.

The fold-up apparatus 48 is electrically driven and serves for the motorized folding in of the outside mirror, as needed. The motorized fold-up apparatus 48 possesses a holder boring 50. The loop 46 of the carrier plate 8 aligns with the hinge eye 14 and when the motorized fold-up apparatus 48 is inserted into the loop 46, then the holder boring 50 aligns with the hinge boring 24 in the short wing 20 of the holder 16. In the mounted state, then fastening bolt 26 penetrates the hinge boring 24 and the holder boring 50 and bindingly connects the mirror holder 16 with the remaining components of the outside mirror.

In FIG. 4 is also shown a multi-tooth indexer 52 (not shown in FIG. 1 for clarity) by means of which the outside mirror may be set to certain angles in reference to its holder. The multi-tooth indexer 52 includes an upper indexer part 54 and a corresponding lower indexer part 56. The upper indexer part 54 is found on the underside of the motorized fold-up apparatus 48 and, when installed, comes, in a built-in condition, to lie on the underside of the loop 46. The matching lower indexer 56 is placed on the short wing 20 of the mirror holder 16 about the hinge boring 24.

Figure 6:
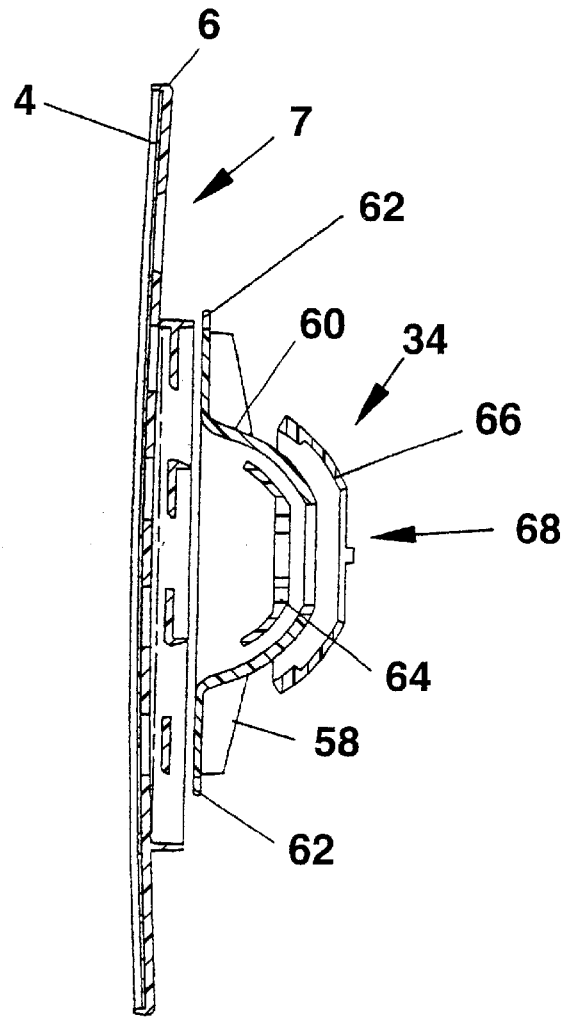
Figure 7:
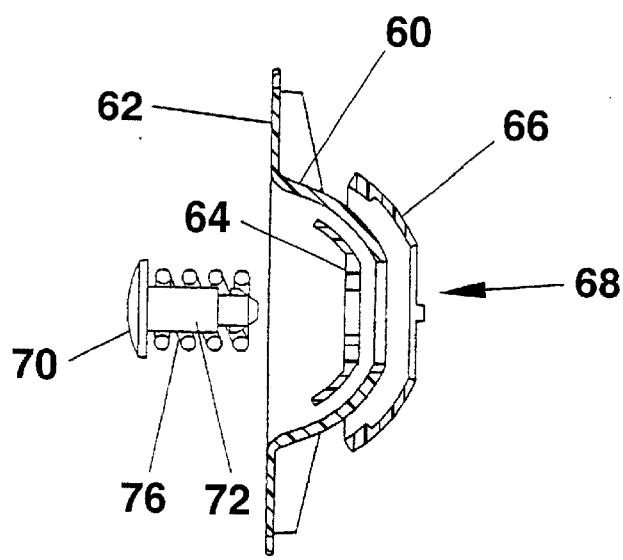

FIG. 6 shows a sectional presentation of a mirror assembly 7 with the mirror pane 4, which adheres to the surface of the raster plate 6. The construction of this mirror assembly 7 has been made known by EP-A-0 609 508. The raster plate 6 is mounted on a hemispherical plate 58, which possesses another hemisphere 60 and a flange 62. The hemisphere part 60 is clamped in between an inner and an outer holding shell 64 and 66. The hemispherical part 60, as well as inner and outer holding shells 64, 66, possess a central boring 68, which is penetrated by a mounting bolt 70. The mounting bolt 70 includes bayonet element 72, which engages into a corresponding bayonet lock-in 74 located in the wall carrier plate 8a, as this is shown in FIG. 4. Shell 66 fits into spherical indentation 45 in carrier plate 8a. The mounting bolt 70 also passes through a helical spring 76, so that the mirror assembly 7, with the mirror pane 4, mounted on the hemispherical plate 58 can be manually adjusted or tilted.

The horizontal sectional presentation of the double wall carrier plate 8 in FIG. 5 shows a traffic marking detection sensor 78, which is built in to the free space 42 between the front and back walls 36, 38 respectively. The traffic marking detector sensor includes an infrared sending element 80 as well as an infrared receiving element 82. In the integrated condition, the sensor 78, that is, the send/receive elements 80,82, are directed down upon the road pavement. By means of the difference in reflectivity, the traffic markings become recognized. Such sensors 78 are, for instance, available from the firm ADC GmbH in Lindau, Germany.

The free space between the cross webs 44 can also still be used for the integration of other functional elements, such as GPS receiving units and the like.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. An external rearview mirror assembly for a vehicle, the assembly comprising:

a mirror holder for attachment to the vehicle;

a housing pivotably secured to the mirror holder so as to pivot around a pivot axis;

a mirror pane attached to the housing; and a carrier plate disposed within the housing, the mirror pane mounted to the housing via the carrier plate, the carrier plate defining a curved substantially U-shaped first end portion with a radius of curvature along the first end portion extending in a plane substantially perpendicular to the pivot axis, the first end portion curving substantially around the pivot axis, the carrier plate having a substantially wedge-shaped second end portion spaced from the first end portion, the carrier plate tapering inward toward the second end portion.

2. The assembly of claim 1, wherein the first end portion defines an open space within the first end portion.

3. The assembly of claim 1, further including a bolt assembly extending through the mirror holder and the carrier plate along the pivot axis, the housing and the carrier plate pivoting around the bolt assembly relative to the mirror holder.

4. The assembly of claim 1, further including a motorized fold-up apparatus mounted in the housing for pivoting the housing around the pivot axis relative to the mirror holder.

5. The assembly of claim 1, further including an electric adjustment assembly secured to the carrier plate for moving the mirror pane relative to the carrier plate.

6. The assembly of claim 1, further including a manual adjustment assembly for permitting movement of the mirror pane relative to the carrier plate.

7. The assembly of claim 6, wherein the manual adjustment assembly includes a series of spring-loaded spherical surfaces.

8. The assembly of claim 7, wherein the manual adjustment assembly includes a plate having a spherical position and a flange portion, the flange portion secured to the carrier plate.

9. An external rearview mirror assembly for a vehicle, the assembly comprising:
   a mirror holder for attachment to the vehicle;
   a housing pivotably secured to the mirror holder so as to pivot around a pivot axis;
   a mirror pane attached to the housing; and
   a carrier plate disposed within the housing, the mirror pane mounted to the housing via the carrier plate, the carrier plate defining a curved substantially U-shaped end portion with a radius of curvature along the end portion extending in a plane substantially perpendicular to the pivot axis, the end portion curving substantially around the pivot axis, the end portion defining an open space within the end portion, the carrier plate including a web extending across the end portion within the open space.

10. An external rearview mirror assembly for a vehicle, the assembly comprising:
    a mirror holder for attachment to the vehicle;
    a housing pivotably secured to the mirror holder so as to pivot around a pivot axis;
    a mirror pane attached to the housing;
    a carrier plate disposed within the housing, the mirror pane mounted to the housing via the carrier plate, the carrier plate defining a curved substantially U-shaped end portion with a radius of curvature along the end portion extending in a plane substantially perpendicular to the pivot axis, the end portion curving substantially around the pivot axis; and
    a spring-loaded bolt assembly extending through the mirror holder and the carrier plate along the pivot axis, the housing and the carrier plate pivoting around the bolt assembly relative to the mirror holder.

11. The assembly of claim 10, wherein the bolt assembly includes an indexer assembly for selectively positioning the housing in one of a plurality of positions relative to the mirror holder.

12. The assembly of claim 11, wherein the indexer assembly includes a first toothed ring secured to the housing and a second toothed ring secured to the mirror holder.

13. The assembly of claim 12, wherein the first and second toothed rings are located coaxial with the pivot axis.

14. An external rearview mirror assembly for a vehicle, the assembly comprising:
    a mirror holder for attachment to the vehicle;
    a housing pivotably secured to the mirror holder so as to pivot around a pivot axis;
    a mirror pane attached to the housing;
    a carrier plate disposed within the housing, the mirror pane mounted to the housing via the carrier plate, the carrier plate defining a curved substantially U-shaped end portion with a radius of curvature along the end portion extending in a plane substantially perpendicular to the pivot axis, the end portion curving substantially around the pivot axis, the end portion defining an open space within the end portion; and
    a road marking detection sensor disposed within the open space.

15. The assembly of claim 14, wherein the sensor includes an infra-red sender and an infra-red receiver.

16. An external rearview mirror assembly for a vehicle, the assembly comprising:
    a mirror holder for attachment to the vehicle;
    a housing pivotably secured to the mirror holder so as to pivot around a pivot axis;
    a mirror pane attached to the housing; and
    a carrier plate disposed within the housing, the mirror pane mounted to the housing via the carrier plate, the carrier plate including a base plate defining a front wall, a rear wall, and an end portion connecting the front wall and the rear wall, the front wall and the rear wall being spaced from each other adjacent the end portion so as to define an open space therebetween, the front wall, the rear wall, and the end portion being integrally formed, the pivot axis extending through the open space, the front wall and the rear wall converging in a direction away from the end portion to form a wedge shape.

17. The assembly of claim 16, wherein carrier plate includes a web extending across the end portion within the open space.

18. The assembly of claim 16, further including a bolt assembly extending through the mirror holder and the carrier plate along the pivot axis, the housing and the carrier plate pivoting around the bolt assembly relative to the mirror holder.

19. The assembly of claim 18, wherein the bolt assembly includes a spring-loaded bolt.

20. The assembly of claim 19, wherein the bolt assembly includes an indexer assembly for selectively positioning the housing in one of a plurality of positions relative to the mirror holder.

21. The assembly of claim 20, wherein the indexer assembly includes a first toothed ring secured to the housing and a second toothed ring secured to the mirror holder.

22. The assembly of claim 16, wherein the front wall, the end portion, and the rear wall are configured substantially as a loop, when viewed in the direction of the pivot axis.

23. A double walled mirror carrier plate for an external rearview mirror assembly for a vehicle, the assembly including a mirror holder for attachment to the vehicle, a housing pivotably secured to the mirror holder so as to pivot around a pivot axis, and a mirror pane disposed within the housing, the carrier plate comprising:
    a base plate defining a curved substantially U-shaped first end portion and a second end portion opposite the first end portion, the first end portion having a radius of curvature along the first end portion extending in a plane substantially perpendicular to the pivot axis, the first end portion curving substantially around the pivot axis, the mirror pane being securable to the base plate spaced from the first end portion, the base plate tapering inward in a direction toward the second end portion to form a wedge shape.

24. The carrier plate of claim 23, wherein the base plate includes a structure for receiving an electric adjustment assembly for moving the mirror pane relative to the carrier plate.

25. The carrier plate of claim 23, wherein the base plate includes a structure for receiving a manual adjustment assembly for permitting movement of the mirror pane relative to the carrier plate.

26. The carrier plate of claim 25, wherein the structure includes a spherical surface.

27. The carrier plate of claim 23, wherein the second end portion is substantially wedge-shaped.

28. The carrier plate of claim 23, wherein the first end portion defines an open space within the first end portion.

29. A double walled mirror carrier plate for an external rearview mirror assembly for a vehicle, the assembly including a mirror holder for attachment to the vehicle, a housing pivotably secured to the mirror holder so as to pivot around a pivot axis, and a mirror pane disposed within the housing, the carrier plate comprising:

a base plate defining a curved substantially U-shaped first end portion and a second end portion opposite the first end portion, the first end portion having a radius of curvature along the first end portion extending in a plane substantially perpendicular to the pivot axis, the first end portion curving substantially around the pivot axis, the mirror pane being securable to the base plate spaced from the first end portion, and a web extending across the first end portion within the open space.

30. An external rearview mirror assembly for a vehicle, the assembly comprising:

a mirror holder for attachment to the vehicle;

a housing pivotably secured to the mirror holder so as to pivot around a pivot axis;

a mirror pane attached to the housing; and a carrier plate disposed within the housing, the mirror pane mounted to the housing via the carrier plate, the carrier plate including a base plate defining a front wall, a rear wall substantially opposing the front wall, and an end portion connecting the front wall and the rear wall, the front wall and the rear wall being spaced from each other adjacent the end portion so as to define an open space therebetween, the front wall, the rear wall, and the end portion being integrally formed, the pivot axis extending through the open space, the mirror pane mounted to the carrier plate solely via the front wall.

31. The assembly of claim 30, wherein the carrier plate is substantially wedge-shaped.

32. The assembly of claim 30, wherein the carrier plate includes a web extending across the end portion within the open space.

33. The assembly of claim 30, further including a road marking detection sensor disposed within the open space.

34. The assembly of claim 30, further including a bolt assembly extending through the mirror holder and the carrier plate along the pivot axis, the housing and the carrier plate pivoting around the bolt assembly relative to the mirror holder.

35. A double walled mirror carrier plate for an external rearview mirror assembly for a vehicle, the assembly including a mirror holder for attachment to the vehicle, a housing pivotably secured to the mirror holder so as to pivot around a pivot axis, and a mirror pane disposed within the housing, the carrier plate comprising:

a base plate defining a front wall, a rear wall substantially opposing the front wall, and an end portion connecting the front wall and the rear wall, the front wall and the rear wall being spaced from each other adjacent the end portion so as to define an open space therebetween, the front wall, the rear wall, and the end portion being integrally formed, the pivot axis extending through the open space, the carrier plate configured for receiving the mirror pane solely via the front wall.

36. The carrier plate of claim 35, wherein the carrier plate is substantially wedge-shaped.

37. The carrier plate of claim 35, wherein the carrier plate includes a web extending across the portion within the open space.

38. The carrier plate assembly of claim 35, further including a road marking detection sensor disposed within the open space.

* * * * *